(12) United States Patent
Zhang et al.

(10) Patent No.: US 11,127,168 B2
(45) Date of Patent: Sep. 21, 2021

(54) METHOD AND APPARATUS FOR GENERATING SIMULATION SCENE

(71) Applicant: Baidu Online Network Technology (Beijing) Co., Ltd., Beijing (CN)

(72) Inventors: Junfei Zhang, Beijing (CN); Chen Yang, Beijing (CN); Qingrui Sun, Beijing (CN); Dun Luo, Beijing (CN); Jiming Mao, Beijing (CN); Fangfang Dong, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 154 days.

(21) Appl. No.: 16/512,741

(22) Filed: Jul. 16, 2019

(65) Prior Publication Data

US 2020/0082573 A1 Mar. 12, 2020

(30) Foreign Application Priority Data

Sep. 10, 2018 (CN) .......................... 201811050985.3

(51) Int. Cl.
*G06T 9/00* (2006.01)
*G06N 3/04* (2006.01)

(52) U.S. Cl.
CPC ........... *G06T 9/002* (2013.01); *G06N 3/0454* (2013.01)

(58) Field of Classification Search
None
See application file for complete search history.

(56) References Cited

U.S. PATENT DOCUMENTS

| 10,917,641 | B2* | 2/2021 | Kanoh | .................... H04N 19/82 |
| 2018/0307930 | A1* | 10/2018 | Mittal | ................ G06K 9/00798 |
| 2020/0184316 | A1* | 6/2020 | Kavukcuoglu | ...... G06N 3/0472 |

FOREIGN PATENT DOCUMENTS

| CN | 106485773 A | 3/2017 |
| CN | 106952325 A | 7/2017 |
| EP | 3298579 A1 | 3/2018 |

* cited by examiner

*Primary Examiner* — Leon Viet Q Nguyen
(74) *Attorney, Agent, or Firm* — Harness, Dickey & Pierce, P.L.C.

(57) ABSTRACT

Embodiments of the present disclosure provide a method and an apparatus for generating a simulation scene. The method includes: acquiring scene parameters of a benchmark scene, where a dimensionality of the scene parameters of the benchmark scene is M; inputting the scene parameters of the benchmark scene into an encoder that is trained, and acquiring encoding parameters according to an output result of the encoder, where a dimensionality of the encoding parameters is N, and N<M; adjusting the encoding parameters to obtain adjusted encoding parameters, and inputting respectively the adjusted encoding parameters into a decoder that is trained; and generating a simulation scene according to the scene parameters of the reconstructed scene that are output by the decoder. According to the method, generating massive simulation scenes similar to the benchmark scene based on the benchmark scene can be achieved, which meets the diversity requirements for the simulation scenes.

17 Claims, 5 Drawing Sheets

METHOD AND APPARATUS FOR GENERATING SIMULATION SCENE

CROSS-REFERENCE TO RELATED APPLICATIONS

The present application claims priority to Chinese application number 201811050985.3, filed on Sep. 10, 2018, which is incorporated by reference in its entirety.

TECHNICAL FIELD

Embodiments of the present disclosure relate to the field of artificial intelligence technologies, and in particular, to a method and an apparatus for generating a simulation scene.

BACKGROUND

Within the past two years, spurt developments have been achieved in autopilot technologies. In order to shorten technology development cycles and ensure the robustness and safety performance of an autopilot system, generating a simulation scene is set as a prerequisite in the actual operation of the autopilot system in most companies at home and abroad. Specifically, multiple simulation scenes are generated by using a simulation technology, the simulation scenes function as a digital display of real road conditions and traffic information flow, and with the help of the generated simulation scenes, performance of the autopilot system is tested. Due to a diversity and complexity of the real road conditions, the simulation scenes can meet requirements for an across-the-board performance testing of the autopilot system only when the simulation scenes are also diverse and complex.

Two methods for generating a simulation scene are mainly used in the prior art. One is to manually edit and generate a set of scene parameters and then combine the scene parameters with a simple motion model to obtain a corresponding simulation scene; the other is to input collected actual road condition information into a simulation engine for playback as a simulation scene.

However, the simulation scenes generated by the above two methods are relatively simple and cannot meet the diversity requirements for the simulation scenes.

SUMMARY

The embodiments of the present disclosure provide a method and an apparatus for generating a simulation scene, which can meet the diversity requirements for a simulation scene of an autopilot system.

In a first aspect, an embodiment of the present disclosure provides a method for generating a simulation scene, including:

acquiring scene parameters of a benchmark scene, where a dimensionality of the scene parameters of the benchmark scene is M;

inputting the scene parameters of the benchmark scene into an encoder that is trained, and acquiring encoding parameters according to an output result of the encoder, where a dimensionality of the encoding parameters is N, and N<M;

adjusting the encoding parameters to obtain adjusted encoding parameters, and inputting respectively the adjusted encoding parameters into a decoder that is trained, where the decoder is configured to acquire scene parameters of a reconstructed scene according to the adjusted encoding parameters, where a dimensionality of the scene parameters of the reconstructed scene is the same as the dimensionality of the scene parameters of the benchmark scene; and generating a simulation scene according to the scene parameters of the reconstructed scene that are output by the decoder.

In an embodiment, the adjusting the encoding parameters to obtain adjusted encoding parameters includes:

determining K dimensions of the encoding parameters, and adjusting parameters of other N-K dimensions than the K dimensions in the encoding parameters to obtain the adjusted encoding parameters, where $1<=K<N$.

In an embodiment, after the generating a simulation scene according to the scene parameters of the reconstructed scene that are output by the decoder, the method further includes:

determining whether the simulation scene is reasonable according to a preset strategy.

In an embodiment, before the inputting the scene parameters of the benchmark scene into an encoder that is trained, the method further includes:

acquiring scene parameters of at least one to-be-trained scene, where a dimensionality of the scene parameters of the to-be-trained scene is M;

inputting the scene parameters of the to-be-trained scene into an encoder to be trained, and acquiring encoding parameters according to an output result of the encoder, where a dimensionality of the encoding parameters is N;

inputting the encoding parameters into a decoder to be trained, and acquiring scene parameters of a reconstructed scene that are output by the decoder; and training the encoder and the decoder that are to be trained according to a difference between the to-be-trained scene and the reconstructed scene, to obtain the encoder and the decoder that are trained.

In an embodiment, the acquiring encoding parameters according to an output result of the encoder includes:

adding a noise with preset distribution to the output result of the encoder to obtain the encoding parameters.

In an embodiment, the noise with preset distribution is a normally distributed noise.

In an embodiment, before the training the encoder and the decoder that are to be trained according to a difference between the to-be-trained scene and the reconstructed scene, the method further includes:

acquiring a reconstruction loss according to the scene parameters of the to-be-trained scene and the scene parameters of the reconstructed scene;

acquiring a normal distribution error according to the output result of the encoder; and acquiring the difference between the to-be-trained scene and the reconstructed scene according to the reconstruction loss and the normal distribution error.

In an embodiment, the acquiring a reconstruction loss according to the scene parameters of the to-be-trained scene and the scene parameters of the reconstructed scene includes:

acquiring the reconstruction loss according to a Euclidean distance between the scene parameters of the to-be-trained scene and the scene parameters of the reconstructed scene; and the acquiring a normal distribution error according to the output result of the encoder includes:

acquiring the normal distribution error according to a mean value and a variance of the output result of the encoder, where dimensionalities of both the mean value and the variance are N.

In an embodiment, the encoder and the decoder are deep neural network models.

In a second aspect, an embodiment of the present disclosure provides an apparatus for generating a simulation scene, including:

an acquiring module, configured to acquire scene parameters of a benchmark scene, where a dimensionality of the scene parameters of the benchmark scene is M;

an encoding module, configured to input the scene parameters of the benchmark scene into an encoder that is trained and acquire encoding parameters according to an output result of the encoder, where a dimensionality of the encoding parameters is N, and N<M;

an adjusting module, configured to adjust the encoding parameters to obtain adjusted encoding parameters;

a decoding module, configured to input respectively the adjusted encoding parameters into a decoder that is trained, where the decoder is configured to acquire scene parameters of a reconstructed scene according to the adjusted encoding parameters, where a dimensionality of the scene parameters of the reconstructed scene is the same as the dimensionality of the scene parameters of the benchmark scene; and a generating module, configured to generate a simulation scene according to the scene parameters of the reconstructed scene that are output by the decoder.

In an embodiment, the adjusting module is specifically configured to:

determine K dimensions of the encoding parameters, and adjust parameters of other N-K dimensions than the K dimensions in the encoding parameters to obtain the adjusted encoding parameters, where 1<=K<N.

In an embodiment, the generating module is further configured to determine whether the simulation scene is reasonable according to a preset strategy.

In an embodiment, the apparatus further includes a training module, where the training module is configured to:

acquire scene parameters of at least one to-be-trained scene, where a dimensionality of the scene parameters of the to-be-trained scene is M;

input the scene parameters of the to-be-trained scene into an encoder to be trained, and acquire encoding parameters according to an output result of the encoder, where a dimensionality of the encoding parameters is N;

input the encoding parameters into a decoder to be trained, and acquire scene parameters of a reconstructed scene that are output by the decoder; and train the encoder and the decoder that are to be trained according to a difference between the to-be-trained scene and the reconstructed scene, to obtain the encoder and the decoder that are trained.

In an embodiment, the training module is specifically configured to:

add a noise with preset distribution to the output result of the encoder to be trained to obtain the encoding parameters.

In an embodiment, the noise with preset distribution is a normally distributed noise.

In an embodiment, the training module is further configured to:

acquire a reconstruction loss according to the scene parameters of the to-be-trained scene and the scene parameters of the reconstructed scene;

acquire a normal distribution error according to the output result of the encoder; and acquire the difference between the to-be-trained scene and the reconstructed scene according to the reconstruction loss and the normal distribution error.

In an embodiment, the training module is specifically configured to:

acquire the reconstruction loss according to a Euclidean distance between the scene parameters of the to-be-trained scene and the scene parameters of the reconstructed scene; and acquire the normal distribution error according to a mean value and a variance of the output result of the encoder, where dimensionalities of both the mean value and the variance are N.

In an embodiment, the encoder and the decoder are deep neural network models.

In a third aspect, an embodiment of the present disclosure provides a device for generating a simulation scene, including: at least one processor and a memory.

The memory stores a computer-executed instruction;

The at least one processor executes the computer-executed instruction stored by the memory so that the at least one processor performs the method for generating a simulation scene as described in any implementation of the first aspect.

In a fourth aspect, an embodiment of the present disclosure provides a computer readable storage medium, where the computer readable storage medium stores a computer-executed instruction, and the computer-executed instruction, when executed by a processor, implements the method for generating a simulation scene as described in any implementation of the first aspect.

In the method and the apparatus for generating a simulation scene provided by the embodiments of the present disclosure, the method includes: acquiring scene parameters of a benchmark scene, where a dimensionality of the scene parameters of the benchmark scene is M; inputting the scene parameters of the benchmark scene into an encoder that is trained, and acquiring encoding parameters according to an output result of the encoder, where a dimensionality of the encoding parameters is N, and N<M; adjusting the encoding parameters to obtain adjusted encoding parameters, and inputting respectively the adjusted encoding parameters into a decoder that is trained, the decoder is configured to acquire scene parameters of a reconstructed scene according to the adjusted encoding parameters, wherein a dimensionality of the scene parameters of the reconstructed scene is the same as the dimensionality of the scene parameters of the benchmark scene, and generating a simulation scene according to the scene parameters of the reconstructed scene that are output by the decoder. According to the method, generating massive simulation scenes similar to the benchmark scene based on the benchmark scene can be achieved, which meets the diversity requirements for the simulation scenes. In addition, the simulation scene obtained based on the benchmark scene in the embodiments of the present disclosure is more real and more complex than the simulation scene generated by the manual editing in the prior art; meanwhile, compared with collecting actual road condition information for playback to generate a simulation scene in the prior art, the method may also avoid a low availability issue of the simulation scene due to a sensor error.

BRIEF DESCRIPTION OF DRAWINGS

To illustrate the technical solutions in the embodiments of the present disclosure or in the prior art more clearly, the drawings required for describing the embodiments or the prior art will be briefly introduced below. Obviously, the accompanying drawings described below show some embodiments of the present disclosure, and persons of ordinary skill in the art may still derive other drawings from these accompanying drawings without creative efforts.

FIG. 1 is a schematic diagram of principles of a method for generating a simulation scene according to an embodiment of the present disclosure.

DESCRIPTION OF EMBODIMENTS

To make the purpose, technical solutions, and advantages of the embodiments of the present disclosure clearer, the technical solutions in the embodiments of the present disclosure are clearly and completely described with reference to the drawings in the embodiments of the present disclosure below. Apparently, the described embodiments are some but not all of the embodiments of the present disclosure. All other embodiments obtained by persons of ordinary skill in the art based on the embodiments of the present disclosure without any creative effort shall fall within the protection scope of the present disclosure.

The terms "first", "second", "third", and "fourth" and the like (if any) in the specification, the claims and the drawings of the present application are used to distinguish different objects, rather than describe a specific order. It is to be understood that data used in this way may be interchanged where appropriate, so that the embodiments of the disclosure described herein can be implemented in a sequence other than those illustrated or described herein. Furthermore, the terms "including", "comprising", "having" and any variation thereof are intended to reference a non-exclusive inclusion. For example, a process, a method, a system, a product, or a device including a series of steps or units is not necessarily limited to the listed steps or units, but optionally also includes other steps or units not listed or inherent to such process, method, product or device.

As described above, in the prior art, for generating a simulation scene for an autopilot system, the following two methods are mainly used. One is to manually edit and generate a set of scene parameters, and then combine the scene parameters with a simple motion model to obtain a corresponding simulation scene; the other is to input collected actual road condition information into a simulation engine for playback as a simulation scene. However, the simulation scene generated by the above means is relatively single, and cannot meet the diversity requirements for the simulation scene.

Figure 1:
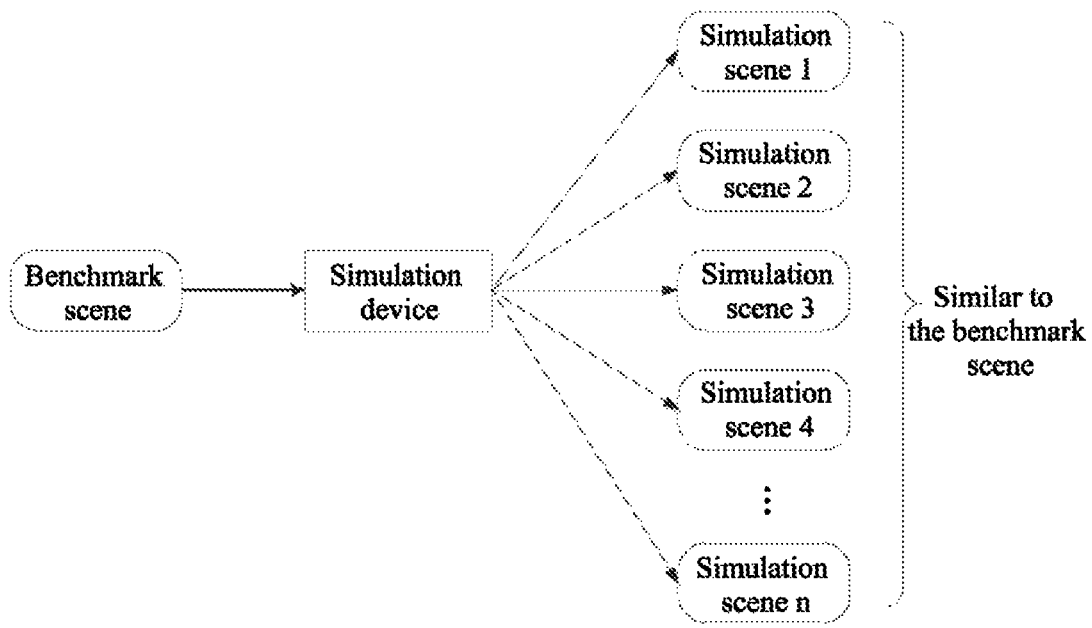

To solve the above problem, an embodiment of the present disclosure provides a method for generating a simulation scene. FIG. 1 is a schematic diagram of principles of a method for generating a simulation scene according to an embodiment of the present disclosure. As illustrated in FIG. 1, the method in the embodiment of the present disclosure may be performed by a simulation device in FIG. 1, and the simulation device can derive a plurality of simulation scenes from one benchmark scene, and the plurality of simulation scenes are all scenes having similarities with the benchmark scene. That is, the plurality of simulation scenes similar to the benchmark scene is generated according to the benchmark scene, thereby making the generated simulation scenes richer and meeting the diversity requirements for the simulation scenes.

In an embodiment of the present disclosure, an encoder and a decoder that are trained are used to implement simulation scene generation. Scene parameters of a benchmark scene are input into the encoder, encoding parameters are obtained according to an output result of the encoder, the encoding parameters are adjusted, and then the adjusted encoding parameters are input into the decoder to obtain a simulation scene similar to the benchmark scene. An embodiment of the present disclosure also provides a method for training the encoder and the decoder. A detailed description from two aspects of a training model and a usage model is as follows.

It should be noted that "a simulation scene similar to the benchmark scene" means that part of information in the benchmark scene is retained in the simulation scene. Same expressions in following embodiments of the present disclosure should be understood in this way, which will not be repeated.

In addition, the method and the apparatus for generating a simulation scene provided by the embodiments of the present disclosure can be applied to any field that needs a simulation scene to be generated, including but not limited to: an autopilot field, a virtual reality field, and the like. In subsequent embodiments of the present disclosure, descriptions are made with the autopilot field taken as an example.

Figure 2:
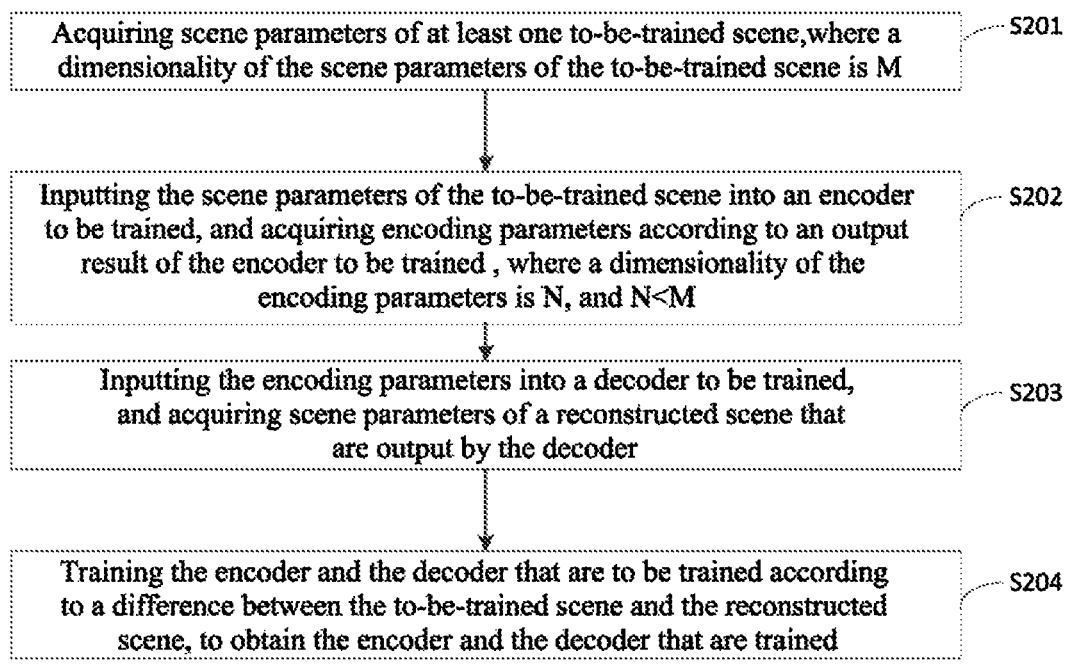
FIG. 2 is a flowchart diagram of a method for training an encoder and a decoder according to an embodiment of the present disclosure.
Figure 3:
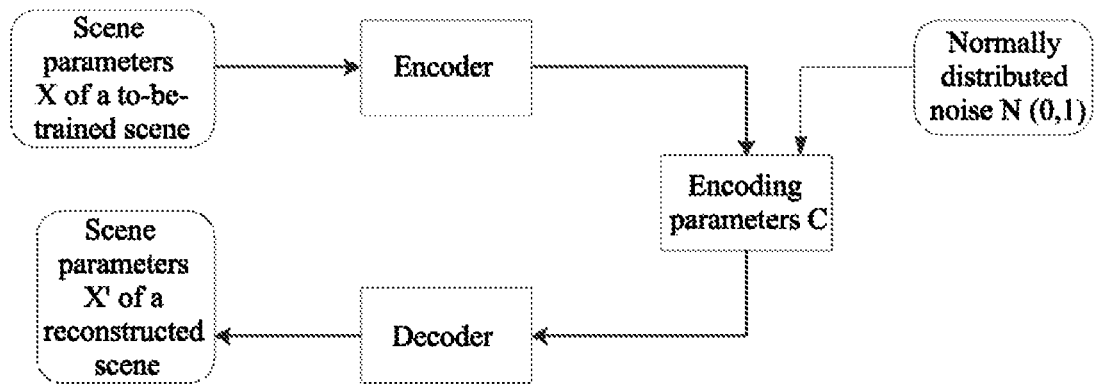
FIG. 3 is a schematic diagram of a process of training an encoder and a decoder according to an embodiment of the present disclosure.

FIG. 2 is a flowchart diagram of a method for training an encoder and a decoder according to an embodiment of the present disclosure, and FIG. 3 is a schematic diagram of a process of training an encoder and a decoder according to an embodiment of the present disclosure.

Training principles of the encoder and the decoder in this embodiment will firstly be briefly described below with reference to FIG. 3. As illustrated in FIG. 3, scene parameters X of a to-be-trained scene are input into the encoder, and the scene parameters X are encoded by the encoder for dimensionality reduction, and lower-dimensional encoding parameters are generated. Then the encoding parameters are input into the decoder, and the decoder reconstructs a scene according to the encoding parameters to obtain scene parameters X' of the reconstructed scene. According to a difference between the to-be-trained scene and the reconstructed scene, parameters in the encoder and in the decoder are adjusted, and the above process is repeated until the reconstructed scene is as similar as possible to the to-be-trained scene.

As illustrated in FIG. 2 and FIG. 3, the method includes:

S201: acquiring scene parameters of at least one to-be-trained scene, where a dimensionality of the scene parameters of the to-be-trained scene is M.

Here, the to-be-trained scene may be image data of a real scene collected by a road test, for example, video data of a real road condition. It can be understood that the to-be-trained scene obtained by an actual road test is usually a dynamic scene, that is, which has a certain time range. For example, the collected to-be-trained scene usually lasts for 3 to 5 seconds. Therefore, for acquiring the scene parameters of the to-be-trained scene, the video data of each to-be-trained scene may be sampled. For example, sampling is performed at a certain frame interval for each to-be-trained scene, and image data of several frames is acquired. Then, with the sampled image data, the scene parameters of the to-be-trained scene are acquired.

It should be noted that both an amount of the to-be-trained scenes and a sampling strategy of the to-be-trained scene are not specifically limited in the embodiment of the present disclosure.

Specifically, the scene parameters may include a map parameter, a state parameter of a vehicle to be tested, and a state parameter of an obstacle vehicle. The vehicle to be tested refers to an unmanned self-driving vehicle to be tested, and the obstacle vehicle refers to other vehicle than the vehicle to be tested in a scene. Since the to-be-trained scene is a scene that changes with time, the acquired scene parameters are also vectors that change with time. In a specific implementation, the map parameter can be used as a column vector, the state parameter of the vehicle to be tested is used as a column vector, and the state parameter of the obstacle vehicle is used as a column vector.

It should be noted that a method for extracting the scene parameters according to the to-be-trained scene is not specifically limited in the embodiment of the present disclosure, and may be extracted by using a method in the prior art.

In this embodiment, the scene parameters are denoted as $X=[m^T \ c^T \ o^T]^T$, where m is a column vector corresponding to the map parameter, and c is a column vector corresponding to the state parameter of the vehicle to be tested, and o is a column vector corresponding to the state parameter of the obstacle vehicle.

The map parameter may include at least one of following information: lane information, traffic light information, traffic restriction information, intersection information, etc.; the state parameter of the vehicle to be tested may include at least one of following information: speed, acceleration, direction, etc.; and the state parameter of the obstacle vehicle may include at least one of following information: a relative distance between the obstacle vehicle and the vehicle to be tested, a relative speed, and the like.

It is to be understood that information included in the map parameter, in the state parameter of the vehicle to be tested, and in the state parameter of the obstacle vehicle are not specifically limited in the embodiment of the present disclosure. The foregoing is merely an exemplary description. Generally, in order to describe a scene better, a dimensionality of the scene parameters is generally high, and the dimensionality of the scene parameters can be understood as an amount of included parameters.

In this embodiment, it is assumed that the dimensionality of the scene parameters of the to-be-trained scene is M, where each dimension is used to indicate one of the following parameters: the map parameter, the state parameter of the vehicle to be tested, and the state parameter of the obstacle vehicle.

S202: Inputting the scene parameters of the to-be-trained scene into an encoder to be trained, and acquiring encoding parameters according to an output result of the encoder to be trained, where a dimensionality of the encoding parameters is N, and N<M.

S203: Inputting the encoding parameters into a decoder to be trained, and acquiring scene parameters of a reconstructed scene that are output by the decoder.

S204: Training the encoder and the decoder that are to be trained according to a difference between the to-be-trained scene and the reconstructed scene, to obtain the encoder and the decoder that are trained.

Here, the encoder is configured to perform encoding and dimensionality reduction on the M-dimensional scene parameters X to obtain an N-dimensional encoding parameters C. The decoder is configured to perform decoding and dimensionality increase on the N-dimensional encoding parameters C to obtain an M-dimensional scene parameters X'. The dimensionality N of the encoding parameters C is much less than the dimensionality M of the scene parameters X.

In a specific implementation, both the encoder and the decoder can be implemented by a deep neural network model. The deep neural network model may be, for example, a Recurrent Neural Network (RNN). Specifically, for example, a long-short-term memory (LSTM) model or a Gated Recurrent Unit (GRU) model may be employed, where the GRU model is a variant of the LSTM model. For the GRU model, the network is made up of multiple stacked layers of RNNs.

In this embodiment, by using the encoder for performing encoding and dimensionality reduction on high-dimensional (M-dimensional) scene parameters, low-dimensional (N-dimensional) encoding parameters can be used to indicate information of the to-be-trained scene, which facilitates generating a new simulation scene by adjusting the encoding parameters subsequently.

As illustrated in FIG. 3, the scene parameters X of the to-be-trained scene are input into the encoder to be trained, and the encoder learns the scene parameters by using a deep learning algorithm, and reduces the dimensionality of the scene parameters to obtain the N-dimensional encoding parameters. Then, the N-dimensional encoding parameters C are input into the decoder, and the decoder performs scene reconstruction based on the encoding parameters C to obtain the scene parameters X' of the reconstructed scene.

Further, the parameters in the encoder and in the decoder may be adjusted according to the difference between the to-be-trained scene and the reconstructed scene, so that the reconstructed scene is as similar as possible to the to-be-trained scene. Therefore, it can be understood that the encoder and the decoder that are trained in this embodiment can be used to generate a new scene according to a specific scene, and also the new scene having similarity with the specific scene can ensured.

In a specific training process, for determining the difference between the to-be-trained scene and the reconstructed scene, there may be multiple evaluation modes, and an optional implementation may be described in detail in following embodiments, and details are not described here.

In this embodiment, training the encoder and the decoder may adopt a process of training a variational auto-encoder, which belongs to an unsupervised learning method and does not need the scene parameters of the training scene to be manually noted in advance, thereby reducing an input of human and material resources in the training process.

In a specific implementation, in step S202, there are various implementations for acquiring the encoding parameters according to the output result of the encoder. In an optional embodiment, the output result of the encoder is directly used as the encoding parameters. In another optional implementation, a noise with preset distribution is added to the output result of the encoder to be trained to obtain the encoding parameters.

In an embodiment, as illustrated in FIG. 3, the noise with preset distribution is a normally distributed noise.

It can be understood that by adding the normally distributed noise to the output result of the encoder, improving the robustness of the encoder and the decoder finally obtained by the training and improving the scene learning ability of the encoder and the decoder are possible.

In addition, since a scene distribution in an actual application satisfies the Gaussian mixture model, in this embodiment, by adding the normally distributed noise to the output result of the encoder, a simulation scene generated according to the encoder and the decoder that are trained also can satisfy the normal distribution, thus the distribution thereof is in consistent with a distribution of an actual scene, making the generated simulation scene more realistic.

Figure 4:
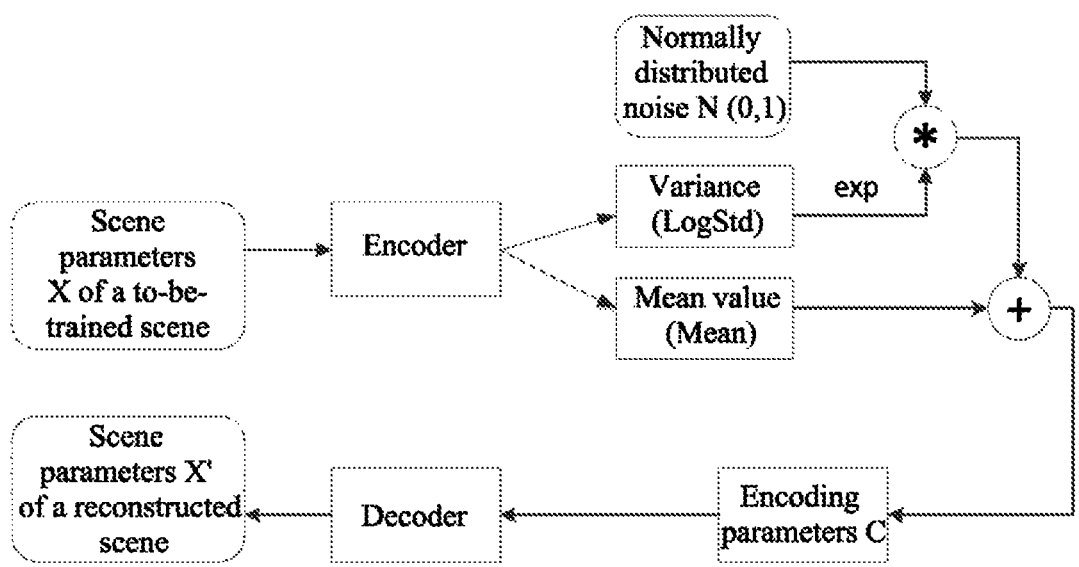
FIG. 4 is another schematic diagram of a process of training an encoder and a decoder according to an embodiment of the present disclosure.

FIG. 4 is another schematic diagram of a process of training an encoder and a decoder according to an embodiment of the present disclosure. Based on the foregoing embodiments, this embodiment illustrates how to add the normal distributed noise to the output result of the encoder.

In a specific implementation, a mean value (Mean) and a variance (LogStd) corresponding to the output result of the encoder may be determined according to the output result of the encoder, where dimensionalities of both the mean value (Mean) and the variance (LogStd) are N.

As illustrated in FIG. 4, * indicates a multiplication operation, + indicates an addition operation, and exp indicates an exponential operation. Specifically, the variance (LogStd) is subjected to an exponential operation and then multiplied by the normal distributed noise, and then an obtained result thereof is added to the mean value (Mean) to obtain the encoding parameters C.

Further, in the process of training the encoder and the decoder, the difference between the to-be-trained scene and the reconstructed scene mainly comes from following two aspects: (1) a reconstruction loss, due to scene reconstruction by the encoder and the decoder; and (2) a normal distribution error, that is, an error between the reconstructed scene and the to-be-trained scene due to an introduction of the normal distributed noise.

A method for acquiring the difference between the to-be-trained scene and the reconstructed scene is described in detail below with reference to a specific embodiment.

Figure 5:
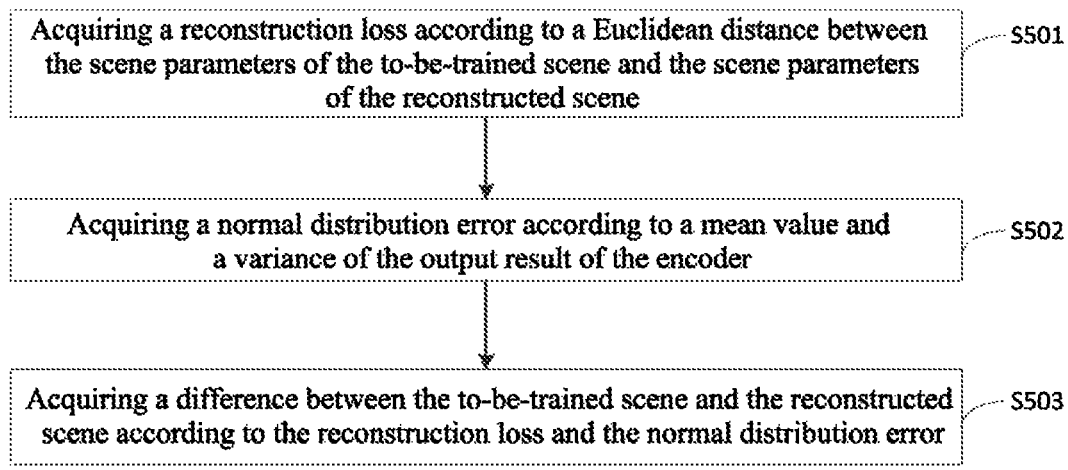
FIG. 5 is a schematic flowchart diagram of acquiring a difference between a to-be-trained scene and a reconstructed scene according to an embodiment of the present disclosure.

FIG. 5 is a schematic flowchart diagram of acquiring a difference between a to-be-trained scene and a reconstructed scene according to an embodiment of the present disclosure, and as illustrated in FIG. 5, the method includes:

S501: acquiring the reconstruction loss according to a Euclidean distance between the scene parameters of the to-be-trained scene and the scene parameters of the reconstructed scene, as a following formula:

$$loss_{recons} = \|X - X'\|$$

Here, $loss_{recons}$ is the reconstruction loss, X is the scene parameters of the to-be-trained scene, and X' is the scene parameters of the reconstructed scene.

S502: Acquiring a normal distribution error according to the mean value and the variance of the output result of the encoder.

In an alternative implementation, the normal distribution error is obtained according to a following formula:

$$loss_{normal} = \sum_{i=1}^{N} (\exp(LogStd_i) - (1 + LogStd_i) + Mean_i^2)$$

Here, $loss_{normal}$ is the normal distribution error, $Mean_i$ is the mean value of an i-th dimensionality of the output result of the encoder, and $LogStd_i$ is the variance of the i-th dimensionality of the output result of the encoder.

S503: Acquiring the difference between the to-be-trained scene and the reconstructed scene according to the reconstruction loss and the normal distribution error.

The difference between the to-be-trained scene and the reconstructed scene is denoted as loss, which can be obtained according to a following formula:

$$loss = loss_{recon} + loss_{normal}$$

A specific embodiment is used below to describe a method for generating a simulation scene by an encoder and a decoder according to an embodiment of the present disclosure.

Figure 6:
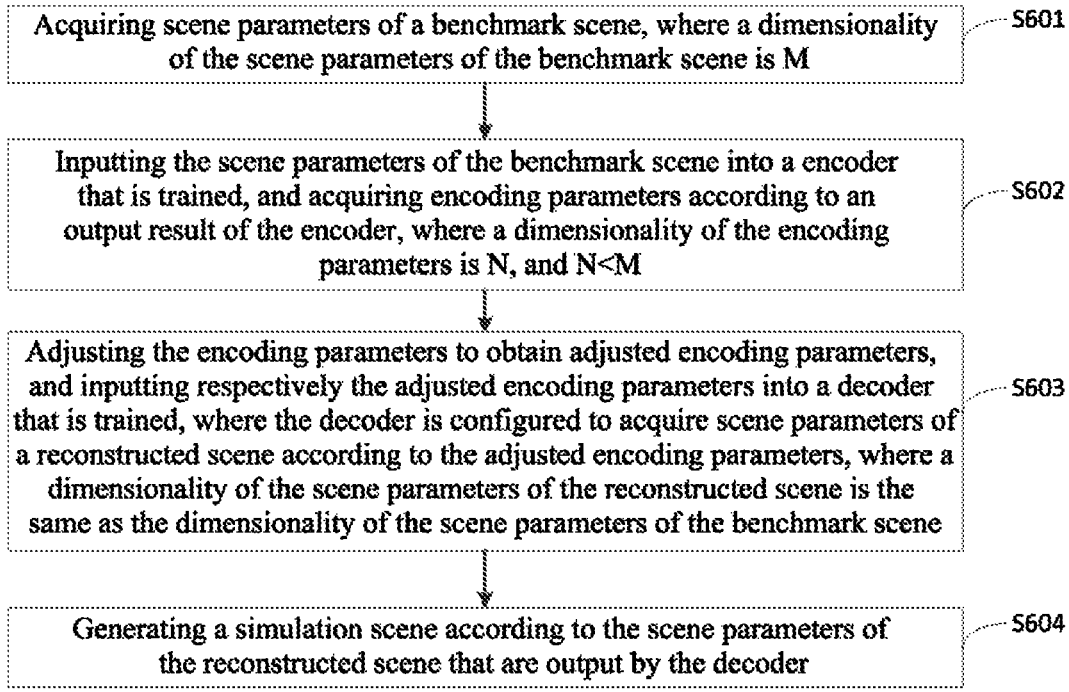
FIG. 6 is a schematic flowchart diagram of a method for generating a simulation scene according to an embodiment of the present disclosure.
Figure 7:
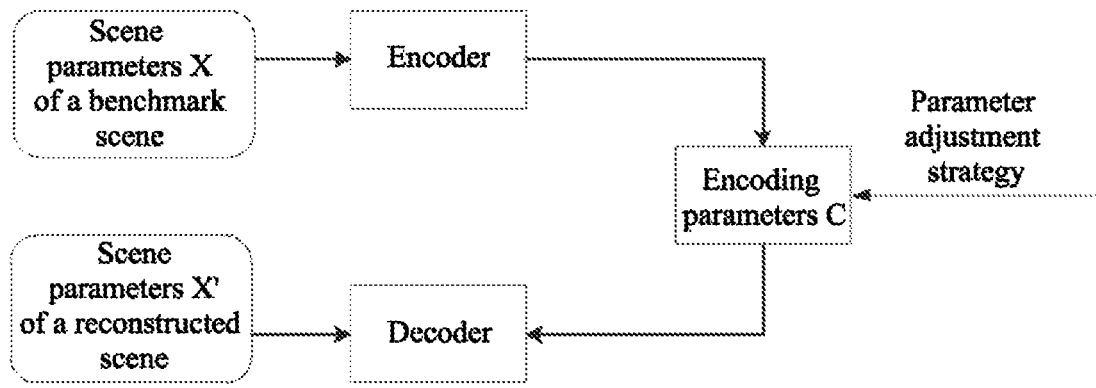
FIG. 7 is a schematic diagram of a process of generating a simulation scene according to an embodiment of the present disclosure.

FIG. 6 is a schematic flowchart diagram of a method for generating a simulation scene according to an embodiment of the present disclosure, and FIG. 7 is a schematic diagram of a process of generating a simulation scene according to an embodiment of the present disclosure. With reference to FIG. 6 and FIG. 7, the method in this embodiment may include:

S601: acquiring scene parameters of a benchmark scene, where a dimensionality of the scene parameters of the benchmark scene is M.

Here, the benchmark scene may be a specific scene that meets specific testing needs.

The method for obtaining the scene parameters of the reference scene in this embodiment is similar to S201 in the foregoing embodiment, and details are not repeated here.

S602: Inputting the scene parameters of the benchmark scene into a encoder that is trained, and acquiring encoding parameters according to an output result of the encoder, where a dimensionality of the encoding parameters is N, and N<M.

The encoder that is trained has deep learning capability, and can perform deep learning on the scene parameters of the benchmark scene, and obtain a lower-dimensional encoding parameter according to a higher-dimensional scene parameter. The encoding parameters include most of the information of the benchmark scene.

In an embodiment, acquiring the encoding parameters according to the output result of the encoder, includes:

Adding a noise with preset distribution to the output result of the encoder to obtain the encoding parameters.

In an embodiment, the noise with preset distribution is a normally distributed noise.

It can be understood that a method for adding a noise to the output result of the encoder in this embodiment is similar to that in the foregoing embodiment, and details are not repeated here.

S603: Adjusting the encoding parameters to obtain adjusted encoding parameters, and inputting respectively the adjusted encoding parameters into a decoder that is trained, where the decoder is configured to acquire scene parameters of a reconstructed scene according to the adjusted encoding parameters, where a dimensionality of the scene parameters of the reconstructed scene is the same as the dimensionality of the scene parameters of the benchmark scene.

S604: Generating a simulation scene according to the scene parameters of the reconstructed scene that are output by the decoder.

As illustrated in FIG. 7, since the encoding parameters C obtained from the encoding by the encoder has a dimensionality much less than the dimensionality of the scene parameters X of the benchmark scene, in this embodiment, by adjusting the encoding parameters C and inputting the adjusted encoding parameters into the decoder, the scene parameters X' of the reconstructed scene is obtained.

Since a scene loss in the encoder and the decoder has been ensured to be as less as possible in the training phase, the scene parameters X' of the reconstructed scene obtained according to the adjusted encoding parameters in this embodiment also retains part of information of the scene parameters X of the benchmark scene, thus the reconstructed scene obtained according to the adjusted encoding parameters can be used as a simulation scene corresponding to the benchmark scene.

Specifically, there may be various adjustment methods for adjusting the encoding parameters C. It can be understood that a simulation scene corresponding to the benchmark scene can be generated in each adjustment of the encoding parameters C. The more the modes of adjusting the encoding parameters C, the more the number of the simulation scenes generated, that is, the simulation scenes derived from the benchmark scene are also richer, meeting the diversity requirements for the simulation scenes.

In an embodiment, the adjusting the encoding parameters to obtain adjusted encoding parameters includes:

determining K dimensions of the encoding parameters, and adjusting parameters of other N-K dimensions than the K dimensions in the encoding parameters to obtain the adjusted encoding parameters, where $1<=K<N$. That is, partial dimensions of the encoding parameters C are fixed, and the parameters in remaining dimensions are adjusted to obtain the adjusted encoding parameters.

It can be understood that the smaller the range and/or the amplitude of an adjustment to the encoding parameters C, the higher the similarity between the obtained simulation scene and the benchmark scene, and the larger the range and/or the amplitude of an adjustment to the encoding parameters C, the lower the similarity between the obtained simulation scene and the benchmark scene. Therefore, in practical applications, it is possible to fine-tune certain special benchmark scenes by controlling the range and/or amplitude of an adjustment to the encoding parameters C, thereby guiding fine control of an auto driving algorithm.

Through above-mentioned modes of adjusting the encoding parameters, it is possible to implement traversal adjustments to each dimension and each combination of dimensions of the encoding parameters, so that all possible deformations of the benchmark scene can be realized, that is, all possible simulation scenes similar to the benchmark scene can be derived, further enhancing the diversity of the simulation scenes.

In an embodiment, after generating the simulation scene, the method further includes: determining whether the simulation scene is reasonable according to a preset strategy.

It can be understood that some adjustment modes may make the generated simulation scene unreasonable due to the adjustment to the encoding parameters. For example, a vehicle to be tested in the generated simulation scene may be outside a visible range of a map, or there may be traffic light information errors in the generated simulation scene.

In a specific implementation, it is possible to determine whether the simulation scene is reasonable according to a preset strategy, and to apply a reasonable simulation scene to the auto driving test, and to eliminate an unreasonable simulation scene.

The method for generating a simulation scene provided by the embodiments of the present disclosure includes: acquiring scene parameters of a benchmark scene, where a dimensionality of the scene parameters of the benchmark scene is M; and inputting the scene parameters of the benchmark scene into an encoder that is trained, and acquiring encoding parameters according to an output result of the encoder, where a dimensionality of the encoding parameters is N, and N<M; adjusting the encoding parameters to obtain adjusted encoding parameters, and inputting respectively the adjusted encoding parameters into a decoder that is trained, the decoder is configured to acquire scene parameters of a reconstructed scene according to the adjusted encoding parameters, wherein a dimensionality of the scene parameters of the reconstructed scene is the same as the dimensionality of the scene parameters of the benchmark scene, and generating a simulation scene according to the scene parameters of the reconstructed scene that are output by the decoder. According to the method, generating massive simulation scenes similar to the benchmark scene based on the benchmark scene can be achieved, which meets the diversity requirements for the simulation scenes. In addition, the simulation scene obtained based on the benchmark scene in this embodiment is more real and more complex than the simulation scene generated by the manual editing in the prior art; meanwhile, compared with collecting actual road condition information for playback to generate a simulation scene in the prior art, the method may also avoid a low availability issue of the simulation scene due to a sensor error.

Figure 8:
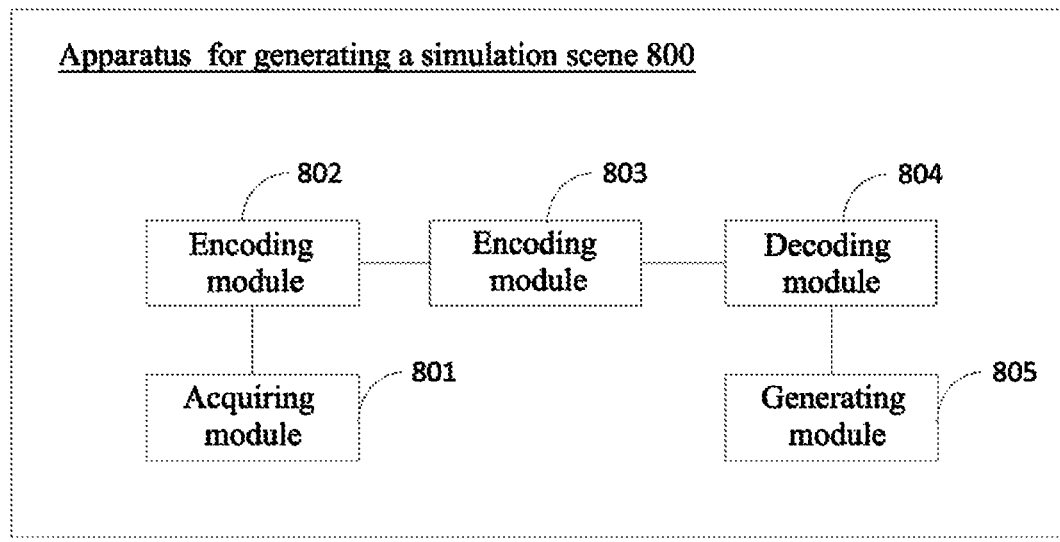
FIG. 8 is a schematic structural diagram I of an apparatus for generating a simulation scene according to an embodiment of the present disclosure.

FIG. 8 is a schematic structural diagram I of an apparatus for generating a simulation scene according to an embodiment of the present disclosure. As illustrated in FIG. 8, an apparatus 800 for generating a simulation scene provided by this embodiment may include: an acquiring module 801, an encoding module 802, an adjusting module 803, a decoding module 804 and a generating module 805.

The acquiring module 801 is configured to acquire scene parameters of a benchmark scene, where a dimensionality of the scene parameters of the benchmark scene is M.

The encoding module 802 is configured to input the scene parameters of the benchmark scene into a encoder that is trained, and acquire encoding parameters according to an output result of the encoder, where a dimensionality of the encoding parameters is N, and N<M;

The adjusting module 803 is configured to adjust the encoding parameters to obtain adjusted encoding parameters.

The decoding module 804 is configured to input respectively the adjusted encoding parameters into a decoder that is trained, where the decoder is configured to acquire scene parameters of a reconstructed scene according to the adjusted encoding parameters, where a dimensionality of the scene parameters of the reconstructed scene is the same as the dimensionality of the scene parameters of the benchmark scene.

The generating module 805 is configured to generate a simulation scene according to the scene parameters of the reconstructed scene that are output by the decoder.

The apparatus for generating a simulation scene provided by the embodiment of the present disclosure can be used to perform the method embodiment illustrated in FIG. 6, and implementation principles and technical effects thereof are similar, and details are not repeated here.

Figure 9:
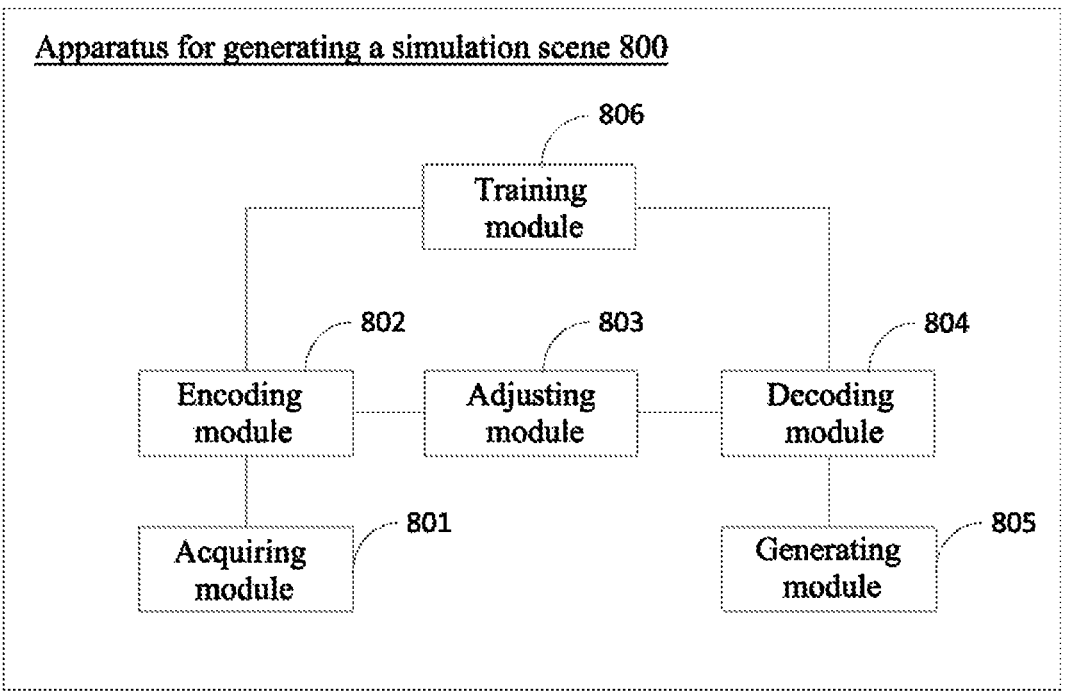
FIG. 9 is a schematic structural diagram II of an apparatus for generating a simulation scene according to an embodiment of the present disclosure.

FIG. 9 is a schematic structural diagram II of an apparatus for generating a simulation scene according to an embodiment of the present disclosure. As illustrated in FIG. 9, on the basis of the embodiment illustrated in FIG. 8, the apparatus 800 for generating a simulated scene provided by this embodiment may further include a training module 806.

In an embodiment, the adjusting module 803 is specifically configured to:

determine K dimensions of the encoding parameters, and adjusting parameters of other N-K dimensions than the K dimensions in the encoding parameters to obtain the adjusted encoding parameters, where $1<=K<N$.

In an embodiment, the generating module 805 is further configured to determine whether the simulated scene is reasonable according to a preset strategy.

In an embodiment, the training module 806 is configured to:

acquire scene parameters of at least one to-be-trained scene, where a dimensionality of the scene parameters of the to-be-trained scene is M;

input the scene parameters of the to-be-trained scene into an encoder to be trained, and acquire encoding parameters according to an output result of the encoder, where a dimensionality of the encoding parameters is N;

input the encoding parameters into a decoder to be trained, and acquire scene parameters of a reconstructed scene that are output by the decoder; and train the encoder and the decoder that are to be trained according to a difference between the to-be-trained scene and the reconstructed scene, to obtain the encoder and the decoder that are trained.

In an embodiment, the training module 806 is specifically configured to:

add a noise with preset distribution to the output result of the encoder to be trained to obtain the encoding parameters.

In an embodiment, the noise with preset distribution is a normally distributed noise.

In an embodiment, the training module 806 is further configured to:

acquire a reconstruction loss according to the scene parameters of the to-be-trained scene and the scene parameters of the reconstructed scene;

acquire a normal distribution error according to the output result of the encoder; and acquire the difference between the to-be-trained scene and the reconstructed scene according to the reconstruction loss and the normal distribution error.

In an embodiment, the training module 806 is specifically configured to:

acquire the reconstruction loss according to a Euclidean distance between the scene parameters of the to-be-trained scene and the scene parameters of the reconstructed scene; and acquire the normal distribution error according to a mean value and a variance of the output result of the encoder, where the dimensionalities of both the mean value and the variance are N.

In an embodiment, the encoder and the decoder are deep neural network models.

The apparatus for generating a simulation scene provided by the embodiment of the present disclosure may be used to implement the technical solutions of any of the foregoing method embodiments, and implementation principles and technical effects thereof are similar, and details are not repeated here.

Figure 10:
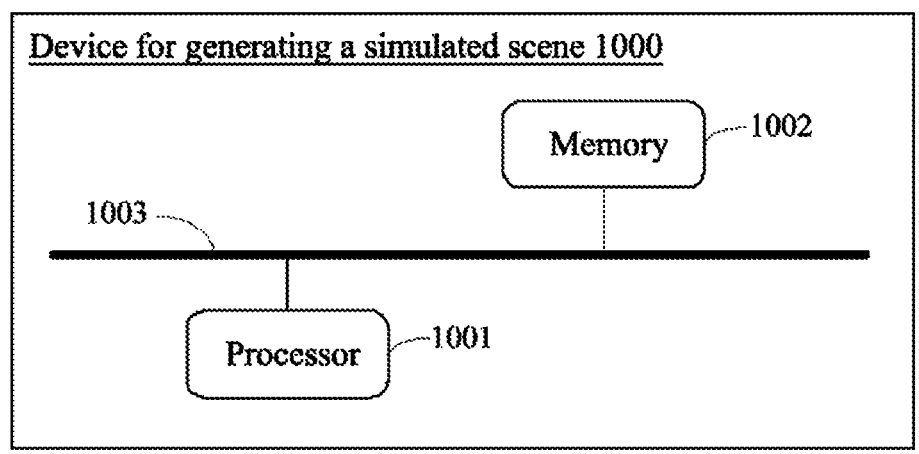
FIG. 10 is a schematic structural diagram of hardware of a device for generating a simulation scene according to an embodiment of the present disclosure.

FIG. 10 is a schematic structural diagram of hardware of a device for generating a simulation scene according to an embodiment of the present disclosure. As illustrated in FIG. 10, a device 1000 for generating a simulated scene provided by this embodiment includes: at least one processor 1001 and a memory 1002. The processor 1001 is connected with the memory 1002 by a bus 1003.

In a specific implementation process, the at least one processor 1001 executes a computer-executed instruction stored by the memory 1002, so that the at least one processor 1001 performs the method for generating a simulation scene performed by the above device 1000 for generating a simulation scene.

For a specific implementation process of the processor 1001, reference may be made to the foregoing method embodiments, and implementation principles and technical effects thereof are similar, and details are not repeated here.

In the above embodiment illustrated in FIG. 10, it should be understood that the processor may be a central processing unit (CPU for short), or a general-purpose processor, a digital signal processor (DSP), an Application Specific Integrated Circuit, etc. The general-purpose processor may be a microprocessor or the processor may be any conventional processor or the like, which in combination with the steps of the method disclosed in the embodiments of the present disclosure may be directly embodied as implementing the steps by a hardware processor, or by a combination of hardware and software modules in the processor.

The memory may include a high speed RAM and may also include a non-volatile memory (NVM), such as at least one disk memory.

The bus may be an Industry Standard Architecture (ISA) bus, a Peripheral Component Interconnect (PCI) bus, or an Extended Industry Standard Architecture (EISA) bus. The bus can be divided into an address bus, a data bus, a control bus, and the like. For ease of representation, the bus in the drawings of the present application is not limited to only one bus or one type of bus.

The present application further provides a computer readable storage medium, where the computer readable storage medium stores a computer-executed instruction, and the computer-executed instruction, when executed by a processor, implements the method for generating a simulation scene performed by the device for generating a simulation scene as described above.

The computer readable storage medium described above may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk. The readable storage medium can be any available media that can be accessed by a general purpose or special purpose computer.

An exemplary readable storage medium is coupled to the processor, so that the processor can read information from the readable storage medium and can write information to the readable storage medium. Of course, the readable storage medium can also be an integral part of the processor. The processor and the readable storage medium may be located in an application specific integrated circuit (ASIC). Of course, the processor and the readable storage medium can also reside as discrete components in the device.

Persons of ordinary skill in the art will appreciate that all or part of the steps to implement the various method embodiments described above may be accomplished by hardware associated with program instructions. The aforementioned program can be stored in a computer readable storage medium. The program, when executed, performs the steps including the foregoing method embodiments; and the foregoing storage medium includes various media that can store program codes, such as a ROM, a RAM, a magnetic disk, or an optical disk.

Finally, it should be noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently replaced; and the modifications or replacements do not have the corresponding technical solutions deviate from the scope of the technical solutions of the embodiments of the present disclosure.

What is claimed is:

1. A method for generating a simulation scene, comprising:
    acquiring scene parameters of a benchmark scene, wherein a dimensionality of the scene parameters of the benchmark scene is M;
    inputting the scene parameters of the benchmark scene into an encoder that is trained, and acquiring encoding parameters according to an output result of the encoder, wherein a dimensionality of the encoding parameters is N, and N<M;
    adjusting the encoding parameters to obtain adjusted encoding parameters, and inputting respectively the adjusted encoding parameters into a decoder that is trained, wherein the decoder is configured to acquire scene parameters of a reconstructed scene according to the adjusted encoding parameters, wherein a dimensionality of the scene parameters of the reconstructed scene is the same as the dimensionality of the scene parameters of the benchmark scene; and
    generating a simulation scene according to the scene parameters of the reconstructed scene that are output by the decoder;
    wherein before the inputting the scene parameters of the benchmark scene into an encoder that is trained, the method further comprises:
    acquiring scene parameters of at least one to-be-trained scene, wherein a dimensionality of the scene parameters of the to-be-trained scene is M;
    inputting the scene parameters of the to-be-trained scene into an encoder to be trained, and acquiring encoding parameters according to an output result of the encoder, wherein a dimensionality of the encoding parameters is N;
    inputting the encoding parameters into a decoder to be trained, and acquiring scene parameters of a reconstructed scene that are output by the decoder; and
    training the encoder and the decoder that are to be trained according to a difference between the to-be-trained scene and the reconstructed scene, to obtain the encoder and the decoder that are trained.

2. The method according to claim 1, wherein the adjusting the encoding parameters to obtain adjusted encoding parameters comprises:
    determining K dimensions of the encoding parameters, and adjusting parameters of other N-K dimensions than the K dimensions in the encoding parameters to obtain the adjusted encoding parameters, wherein 1<=K<N.

3. The method according to claim 1, wherein after the generating a simulation scene according to the scene parameters of the reconstructed scene that are output by the decoder, the method further comprises:
    determining whether the simulation scene is reasonable according to a preset strategy.

4. The method according to claim 1, wherein the acquiring encoding parameters according to an output result of the encoder comprises:
    adding a noise with preset distribution to the output result of the encoder to obtain the encoding parameters.

5. The method according to claim 4, wherein the noise with preset distribution is a normally distributed noise.

6. The method according to claim 5, wherein before the training the encoder and the decoder that are to be trained according to a difference between the to-be-trained scene and the reconstructed scene, the method further comprises:
    acquiring a reconstruction loss according to the scene parameters of the to-be-trained scene and the scene parameters of the reconstructed scene;
    acquiring a normal distribution error according to the output result of the encoder; and
    acquiring the difference between the to-be-trained scene and the reconstructed scene according to the reconstruction loss and the normal distribution error.

7. The method according to claim 6, wherein:
    the acquiring a reconstruction loss according to the scene parameters of the to-be-trained scene and the scene parameters of the reconstructed scene comprises:
    acquiring the reconstruction loss according to a Euclidean distance between the scene parameters of the to-be-trained scene and the scene parameters of the reconstructed scene; and
    the acquiring a normal distribution error according to the output result of the encoder comprises:
    acquiring the normal distribution error according to a mean value and a variance of the output result of the encoder, wherein dimensionalities of both the mean value and the variance are N.

8. The method according to claim 1, wherein the encoder and the decoder are deep neural network models.

9. An apparatus for generating a simulation scene, comprising at least one processor and a memory storing instructions thereon, the processor when executing the instructions, being configured to:
    acquire scene parameters of a benchmark scene, wherein a dimensionality of the scene parameters of the benchmark scene is M;
    input the scene parameters of the benchmark scene into an encoder that is trained and acquire encoding parameters according to an output result of the encoder, wherein a dimensionality of the encoding parameters is N, and N<M;
    adjust the encoding parameters to obtain adjusted encoding parameters;
    input respectively the adjusted encoding parameters into a decoder that is trained, wherein the decoder is configured to acquire scene parameters of a reconstructed scene according to the adjusted encoding parameters, wherein a dimensionality of the scene parameters of the reconstructed scene is the same as the dimensionality of the scene parameters of the benchmark scene; and
    generate a simulation scene according to the scene parameters of the reconstructed scene that are output by the decoder;

wherein the processor is further configured to:
acquire scene parameters of at least one to-be-trained scene, wherein a dimensionality of the scene parameters of the to-be-trained scene is M;
input the scene parameters of the to-be-trained scene into an encoder to be trained, and acquire encoding parameters according to an output result of the encoder, wherein a dimensionality of the encoding parameters is N;
input the encoding parameters into a decoder to be trained, and acquire scene parameters of a reconstructed scene that are output by the decoder; and
train the encoder and the decoder that are to be trained according to a difference between the to-be-trained scene and the reconstructed scene, to obtain the encoder and the decoder that are trained.

10. The apparatus according to claim 9, wherein the processor is configured to:
determine K dimensions of the encoding parameters, and adjust parameters of other N-K dimensions than the K dimensions in the encoding parameters to obtain the adjusted encoding parameters, wherein $1<=K<N$.

11. The apparatus according to claim 9, wherein the processor is further configured to determine whether the simulation scene is reasonable according to a preset strategy.

12. The apparatus according to claim 9, wherein the processor is configured to:
add a noise with preset distribution to the output result of the encoder to be trained to obtain the encoding parameters.

13. The apparatus according to claim 12, wherein the noise with preset distribution is a normally distributed noise.

14. The apparatus according to claim 13, wherein the processor is further configured to:
acquire a reconstruction loss according to the scene parameters of the to-be-trained scene and the scene parameters of the reconstructed scene;
acquire a normal distribution error according to the output result of the encoder; and
acquire the difference between the to-be-trained scene and the reconstructed scene according to the reconstruction loss and the normal distribution error.

15. The apparatus according to claim 14, wherein the processor is configured to:
acquire the reconstruction loss according to a Euclidean distance between the scene parameters of the to-be-trained scene and the scene parameters of the reconstructed scene; and
acquire the normal distribution error according to a mean value and a variance of the output result of the encoder, wherein dimensionalities of both the mean value and the variance are N.

16. The apparatus according to claim 9, wherein the encoder and the decoder are deep neural network models.

17. A computer readable storage medium, wherein the computer readable storage medium stores a computer-executed instruction, and the computer-executed instruction, when executed by a processor, implements the method for generating a simulation scene according to claim 1.

* * * * *